United States Patent Office 3,848,068
Patented Nov. 12, 1974

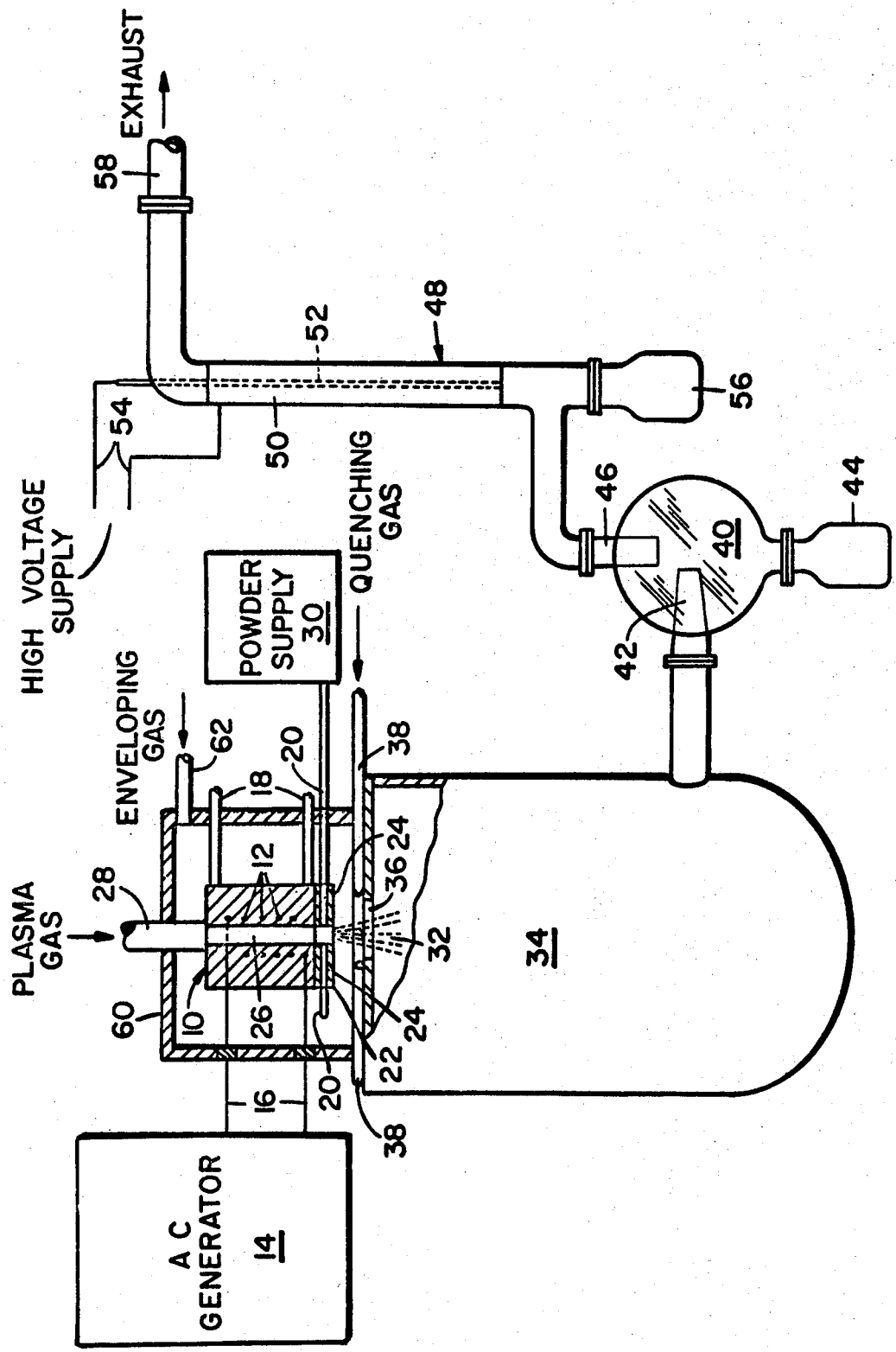

3,848,068
METHOD FOR PRODUCING METAL COMPOUNDS
Dale W. Rice, Horseheads, N.Y., assignor to Corning
Glass Works, Corning, N.Y.
Filed Apr. 21, 1971, Ser. No. 135,973
Int. Cl. C01b 33/18; C01f 7/02; C01g 21/02, 23/04,
25/02, 27/02, 37/02, 49/06
U.S. Cl. 423—335
5 Claims

ABSTRACT OF THE DISCLOSURE

A method for producing ultra-pure finely divided solid compounds of metals. Solid metal particles or atomized molten metals are introduced into a plasma gas stream; the plasma gas contains up to 100% on a free-element basis of a reactant gas selected from oxygen, nitrogen, hydrogen, chlorine, fluorine, and bromine, the balance thereof being substantially inert with respect to the metal. The plasma stream is enveloped with a gas containing up to 100% on a free-element basis of the same reactant gas as is used in or for the plasma gas with the balance thereof being substantially inert with respect to the metal and the plasma gas. After entry into the plasma stream, the particulate metal is vaporized and the metal vapors are caused to chemically react with the reactant gas. The resultant compound is quenched by a stream of gas containing up to 100% on a free-element basis of the same reactant gas as is used in or for the plasma gas with the balance thereof being substantially inert with respect to the resulting compound and the plasma gas. The larger particles, if any, may be separated from the stream and, thereafter, the desired finely divided particles of the compound having a size of up to about 0.5 $\mu$m. (micrometers) are separated from the stream and collected.

BACKGROUND OF THE INVENTION

Field of the Invention

This invention deals with a method for producing very pure compounds of metals, such as oxides, nitrides, hydrides, and halides, in a finely divided form suitable as pigments, for hot pressing and sintering opaque or transparent ceramics, and many other uses.

Description of the Prior Art

Heretofore, some of the more common methods for obtaining particulate compounds of metals have been by chemical means whereby the compound is precipitated from salt solutions, spraying and thereafter drying, freeze-drying, flame conversion, electric arc using an electrode formed of the metal or of graphite impregnated with the metal, and the like. Teachings of some of these methods are as follows. Formation of particles in a direct current arc is discussed in an article entitled "Electron Microscopic Examination of Aerosols Formed in a Direct Current Arc" by J. Amick and J. Turkevich in "Ultrafine Particles," W. E. Kuhn, editor, John Wiley and Sons, Inc. (1963). Flame conversion of titanium tetrachloride to get a titanium dioxide soot is taught in U.S. Pat. No. 3,351,427, to C. B. Wendell et al. Various aspects of forming particulate ceramics and powder preparation is discussed in "Hot Forming of Ceramics" and appendix by Roy W. Rice, pp. 203–250 of "Ultrafine-Grain Ceramics," Syracuse University Press (1970). Conversion of $SiCl_4$ vapors into silicon dioxide is taught in "The Induced Plasma Torch as a High Temperature Chemical Reactor" by A. Audsley and R. K. Bayliss, pp. 33–38, Journal of Chemistry, 1969, vol. 19. Conversion of halides to oxides is treated in "Mixed Oxides Prepared With an Induction Plasma Torch" by T. Barry, R. Bayliss, and L. Lay in the Journal of Materials Science, 3, 1968, pp. 229–243.

It is well known that metal compounds can be produced by various methods set out hereinabove, however, in each instance the resulting compound contains impurities inherently resulting from the process used. For example, in chemical precipitation from salt solutions or otherwise, the precipitate invariably contains impurities from the solution itself or the impurities contained therein. Such methods as spraying and drying, and freeze-drying similarly embody impurities resulting from reaction with the environment, the inability to obtain sufficiently pure materials initially, or the vehicles used in the material solutions. In flame conversion, impurities are incorporated in the ultimate compounds for the reaction of the flame gases with the constituents of the initial compounds or materials used. Such initial compounds or materials often produce compounds other than those desired. Similar problems exist with the electric arc or plasma torch methods heretofore known since impurities are introduced by means of the arc electrodes themselves or the initial compound vapors used in either of such methods.

SUMMARY OF THE INVENTION

Briefly, a method for producing very pure finely divided solid compounds of a metal is provided by introducing into an induction-coupled plasma torch a plasma gas which contains up to 100% on a free-element basis of a reactant gas such as oxygen, nitrogen, hydrogen, chlorine, fluorine, and bromine, the balance of the plasma gas being substantially inert with respect to the metal. A plasma stream is initiated and pure metal in particulate form is introduced into the plasma stream. The plasma stream has an enthalpy sufficient to vaporize the metal. The plasma stream is enveloped with the gas which contains up to 100% on a free-element basis of the same reactant gas as is used in or for said plasma gas and the balance of the enveloping gas being substantially inert with respect to the metal and the plasma gas. The vaporized metal particles are reacted with the reactant gas and thereafter quenched in a stream of gas containing up to 100% on a free-element basis of the same reactant gas as was used in or for said plasma gas. The balance of the quenching stream of gas being substantailly inert with respect to the resulting compound and the plasma gas. The compound so produced is in finely divided form and particles having a size of up to about 0.5 $\mu$m. are separated from the quenching stream and collected. Prior to the separation of the finely divided particles of the compound, the larger pieces of the particulate matter in the quenching stream, that is particles having a size of more than about 10 $\mu$m. may be separated from the quenching stream by any suitable means such as a cyclone.

Accordingly, it is an object of the present invention to provide an improved and economic process for the production of metal compounds which are very pure and finely divided, and which overcome the heretofore noted disadvantages.

Additional objects, features, and advantages of the present invention will become apparent to those skilled in the art, from the following detailed description and the attached drawing on which, by way of example, only the preferred embodiment of the invention is illustrated.

BRIEF DESCRIPTION OF THE DRAWING

The drawing is partly schematic and partly a cross-sectional elevation which illustrates an apparatus for performing the method of the present invention.

DETAILED DESCRIPTION

The present invention will be described in connection with the apparatus as illustrated in the drawing, however, it is to be understood that the specific embodiments of the apparatus illustrated are not limitations on the present method. An induction-coupled plasma torch 10 having induction coil 12 is electrically connected to AC generator 14 by means of electrical lines 16. As will be readily understood, induction-plasma torch 10 is shown somewhat diagrammatically omitting many details since torches are well known in the art. Water cooling is provided to plasma torch 10 by means of coolant lines 18. A suitable coolant for such torches is water although other coolants may, of course, be used. Tubing means 20 is shown connected to the plasma torch faceplate 22 in which are provided suitable passages 24 as continuations of tubing means 20. Plasma torch 10 defines a plasma chamber 26 at its interior, to which chamber is connected a source of plasma gas, not shown, through conduit 28. Tubing means 20 and in turn passages 24 are connected to a suitable source 30 of metallic powder which will thereafter be reacted with the plasma gas to produce the very pure finely divided solid compound of the present invention. Powder supply or source 30 may be any suitable means for providing a constant flow of powder to the plasma tourch. Such a powder supply may be a vibratory means well known in the art or an apparatus for feeding powder as described in U.S. Pat. No. 3,149,759 to J. C. Manley. The powder may be entrained in a carrier gas for ease of conveying it to chamber 26.

A plasma stream is initiated in chamber 26 by passing electrical current from generator 14 through induction coil 12 while a predetermined quantity of plasma gas is caused to flow through the chamber. Plasma stream 32 is then emitted from torch 10 into quenching tank 34 which has an opening 36 at one end facing the exhaust end of the plasma torch.

A plurality of quenching gas nozzles 38 are disposed about opening 36, preferably to emit the quenching gas in a tangential manner. The tangential emission creates a vortex into which the plasma stream is directed and has a stabilizing effect on the plasma stream. As the plasma stream is emitted from torch 10 it and anything entrained in such stream is subjected to the quenching gas.

The quenching tank is connected to cyclone 40. As is understood, the quenched stream emitting from tank 34 is tangentially introduced into cyclone 40 by means of pipe or nozzle 42. Cyclone 40 separates any of the larger particles entrained in the quenched gas and these particles are collected in collecting tank 44. The quenched gas and any entrained smaller particles flow out from cyclone 40 through conduit 46 to electrostatic precipitator 48.

Precipitator 48 includes a pair of electrodes 50 and 52 which are connected by means of lines 54 to a high voltage supply. As illustrated in the drawing, electrode 50 may be a cylindrical metallic member or may be a coating on a glass cylinder, or the like. Electrode 52 is a rod or other shaped member disposed within the precipitator such that an electrical potential is produced across the electrodes.

As the quenched gas stream and any entrained small particles are emitted from cyclone 40 it passes through precipitator 48 where the smaller particles are separated from the stream and collected in container 56 while the quenched gas is exhausted by means of conduit 58. Conduit 58 may be exhausted to ambient or be connected to a suitable blower, not shown, as desired. Any suitable means for separating particles from a gas may be used in place of electrostatic precipitator 48.

In order to prevent contamination of the resulting compound, plasma stream 32 and the surrounding area may be enveloped by a gas containing up to 100% on a free-element basis of the same reactant gas as is used in or for the plasma gas with the balance thereof being substantially inert with respect to the metal and the plasma gas. The plasma stream area may be shielded by an enclosure 60 into which is introduced enveloping gas from a suitable source, not shown, through conduit 62.

The operation of the apparatus shown in the drawing is as follows. A plasma gas is introduced into induction-coupled plasma torch 10 from a suitable source through conduit 28. The plasma gas contains up to 100% on a free-element basis of a reactant gas such as oxygen, nitrogen, hydrogen, chlorine, fluorine, and bromine with the balance of the plasma gas being substantially inert with respect to the metal which is to be converted into the desired compound. Diatomic gases such as these provide the reactant elements to obtain oxides, nitrides, hydrides, and halides. In addition, being diatomic gases higher plasma enthalpy may be obtained because of the bond enthalpy. Induction coil 12 of plasma torch 10 is connected to an AC generator and plasma stream 32 is initiated. Metal in particulate form is introduced into the tail flame of the plasma through passages 24 in plasma torch faceplate 22. The particulate metal is preferably of at most 200 mesh size. One or more of such passages may be provided depending on the particulate metal distribution desired and the other parameters of the system. The particulate metal is supplied to the plasma stream from powder supply 30. As heretofore explained, powder supply 30 may be any vibratory or other mechanical powder feeding device which supplies powder directly or entrained in a carrier gas. A suitable carrier gas for powder feed is argon since argon is substantially inert with almost all other elements, therefore, it would not contaminate the resulting compound. The term "particulate" as used herewith in respect to metal is defined as solid particles or atomized molten metal. It is, therefore, seen that powder supply 30 may be a molten metal atomizer which feeds atomized particles of metal to the plasma stream. Regardless of the type of metal particles supplied, the metal must be in pure form and no impurities may be introduced into the metal by the particulate metal supply source or its carrier gas. The metals suitable for the present purposes, are substantially any metals, alloys thereof, or mixtures thereof which can be fed to the plasma torch in particulate form and which can react with the heretofore noted reactant gases contained in the plasma gas. Examples of suitable metals are aluminum, iron, titanium, lead, magnesium, zirconium, zinc, manganese, chromium, niobium, cobalt, stainless steel, mixtures and alloys thereof, and the like although the present invention is not limited thereto.

As the particulate metal is introduced into the plasma stream the metal is caused to be vaporized, the plasma stream having an enthalpy sufficient to vaporize said metal. The metal vapors then chemically react with the reactant gas, the amount of the reactant gas present being at least sufficient for stoichiometric reaction with the metal. Selection of the proper metal and reacting gas, all other elements present being substantially inert, permits the formation of a very pure metal compound.

The plasma stream area is enveloped by a gas containing up to 100% on a free-element basis of the same reactant gas as is used in or for the plasma gas, the balance of the eneveloping gas being substantially inert with respect to the metal and the plasma gas. Such enveloping gas may be introduced into enclosure 60 or may be permitted to envelope the plasma stream area in any other manner. It is to be noted that the enveloping gas may be air in certain situations where, for example, the reactant gas is oxygen or nitrogen and the balance of the enveloping air is substantially inert with respect to the metal and the plasma gas.

The purpose for having the balance of the plasma gas substantially inert with respect to the metal, and the balance of the enveloping gas substantially inert with respect to the metal and the plasma gas is to prevent chemical reaction therebetween so as to form other compounds which may become impurities in the resulting compound desired. The purpose of having any portion of the enveloping gas the same as the reactant gas is to enhance reaction of the metal with the reactant gas.

Enclosure 60 may be formed of any suitable material such as metal, plastics, and the like.

After the chemical reaction between the reactant gas and the metal vapors, the plasma stream and the reaction products in the stream are directed into quenching tank 34. As the plasma stream enters the quenching tank the stream and the reaction products are quenched by means of a gas directed at the plasma stream. The quenching gas contains up to 100% on a free-element basis of the same reactant gas as used in or for the plasma gas with the balance of the quenching gas being substantially inert with respect to the resulting compound and the plasma gas. Again, the quenching gas must be selected so as not to combine with either the remaining plasma gas or the resulting compound to prevent introduction of impurities into the resulting compound. Upon quenching the plasma stream, the resulting compound is produced in finely divided form. Particles of about 0.002 μm. have been produced in this manner, although particles having a size of up to about 0.5 μm. are suitable for many purposes.

The gases and entrained particles are emitted from quenching tank 34 and directed into some means, such as cyclone 40, for separating the undesirably large particles from the balance. The quenched stream and the entrained particles enter cyclone 40 through a pipe or nozzle 42 in a tangential manner as is well known in the art. The larger particles are caused to separate and be collected in collecting tank 44 while the remaining smaller particles and the quenched stream is passed out of the cyclone by means of the conduit 46. The quenched stream is then transmitted into a means for separating the remaining finely divided particles of the resulting compound from the quenched stream. One such means is an electrostatic precipitator 48 which is connected to a suitable exhaust system by means of conduit 58. The electrodes of the precipitator are connected to a suitably high voltage power supply, such for example as one that would provide about 20 kv. As is understood, the solid particles are collected on the electrodes thereby being separated from the quenched gas which is exhausted. The separated particles are then collected in a suitable container.

As will be understood, a means for separating the larger particles, such as cyclone 40, is not necessary for the purposes of the present invention, however, such means provide improved control over the size of the particles of the resulting compound ultimately collected. Similarly, an electrical precipitator need not be used since any other suitable means for separating particles from a gas may be used.

EXAMPLE I

As a typical example of the present invention, an induction-coupled plasma torch, model 56 by the TAFA Division of the Humphries Corporation was provided and connected to a 4 mHz., 25 kw. generator. A TAFA model 104 vibratory ramp type powder feeder was used. The electrostatic precipitator was formed by means of a pair of 2 inch diameter glass tubes connected in parallel and having an electroconductive coating applied to the exterior thereof along a portion of the length. A central electrode was inserted into each of said glass tubes and both said electrode and said coating were connected to a high voltage power supply capable of providing at least 20 kv. The end of the electrostatic precipitator was connected to a blower to exhaust gases from the precipitator. A quenching tank similar to that shown in the drawing was connected to a high velocity cyclone the outlet of which was connected to said precipitator. The cyclone was a common laboratory high velocity type cyclone. Pure oxygen was introduced into the plasma torch at a supply pressure of 50 p.s.i. and a flow rate of 100 c.f.m. at standard conditions. A plasma stream was initiated having a gas temperature of about $10^{4°}$ K. Titanium metal powder having a 325 mesh size was introduced in an argon carrier gas into the tail flame of the plasma emitted from the plasma torch. Air was used as a quenching gas and was supplied from the surrounding atmosphere. Titanium dioxide was formed by the reaction between the titanium metal powder and the oxygen in the plasma gas and the quenching gas, and entrained titanium dioxide was passed through the cyclone where larger particles were separated and then through the electrostatic precipitator where the titanium dioxide having an average particle size of about 0.018 μm. was collected.

EXAMPLE II

The same system as described in connection with Example I was used. An air plasma was initiated and iron metal powder in an argon gas was introduced into the tail flame of the air plasma.

Analysis showed that the resulting compound had an average size of 0.021 μm. and contained 97.4% by weight of $Fe_2O_3$, the balance being substantially FeO and $Fe_3O_4$. The quenching gas in this example was also air as was the enveloping gas.

EXAMPLE III

The same equipment described in Example I was used in this example with the addition of a plastic enveloping gas enclosure and quenching gas nozzles. The plasma, reactant, enveloping, and quenching gases were oxygen. Powdered magnesium-aluminum alloys having a 325 mesh size were introduced into the tail flame of the plasma employing an argon carrier gas. The plasma gas was provided at a supply pressure of 50 p.s.i. and a flow rate of about 100 c.f.m. at standard conditions. The quenching gas was provided at about 150 c.f.m. and the enveloping gas at about 50 c.f.m. A magnesium aluminate spinel in finely divided form was formed and collected in the electrostatic precipitator. The spinel powder had an average size of 0.02 μm. and contained by weight substantially 30% of MgO and 70% of $Al_2O_3$. This compound is a solid solution.

EXAMPLE IV

The same apparatus was used as in Example I wherein the plasma, enveloping, and quenching gases were air. A mixture of iron-manganese-zinc metals having a particle size of 325 mesh were introduced into the tail flame of the plasma. The resulting compound was nominally $$Mn_{0.6}Zn_{0.4}Fe_2O_4$$

having an average size of about 0.03 μm. This compound is a solid solution.

The following table illustrates other examples of compounds formed by the method of the present invention.

TABLE

| Example | Metal | Metal particle size (mesh) | Plasma gas Type | Supply pres. (p.s.i.) | Flow rate (c.f.m.) | Plasma power (kw.) | Enveloping gas | Quenching gas | Resulting compound | Compound particle size (μm.) |
|---|---|---|---|---|---|---|---|---|---|---|
| V | Cr | 325 | Oxygen | 50 | 100 | 31.5 | Air | Air | $Cr_2O_3$ | 0.075 |
| VI | Nb | 325 | Air | 50 | 100 | 31.5 | Air | Air | $Nb_2O_5$ | 0.056 |
| VII | Fe, Co | 325 | Air | 50 | 100 | 31.5 | Air | Air | Cobalt doped $\gamma Fe_2O_3$ | |
| VIII | Pb, Mg, Nb, Ti, Zr | 325 | Oxygen | 50 | 100 | 31.5 | Oxygen | Oxygen | Mixture of complex oxides of all starting metals.—converted to single phase Perovskite on heating. This is a ferroelectric oxide and is a solid solution. | 0.002-0.04 |
| IX | Stainless steel type 316 | 325 | Air | 50 | 100 | 31.5 | Air | Air | $NiFe_2O_4$ | |
| X | Mg | 325 | Air | 50 | 100 | 31.5 | Air | Air | MgO | 0.025 |

The present method is substantially illustrated by the following diagram where $s$ is solid, $l$ is liquid, and $v$ is vapor.

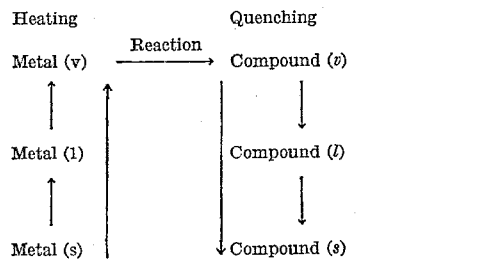

The two routes indicated for solid compound formation from vapor largely determine the particle shape. The two step process in which the vapor condenses to liquid droplets prior to solidification would be expected to yield spherical particles, whereas the direct formation from the vapor would be expected to yield particles whose crystal habit is evident. Striking examples of the two mechanisms are afforded by the two chemically similar compounds $Al_2O_3$ and $Cr_2O_3$. The $Al_2O_3$ particles are spherical, having obviously passed through the liquid phase, whereas the $Cr_2O_3$ particles are thin platelets which have apparently grown directly from the vapor as the gas stream cooled. In other examples, such as $Fe_2O_3$, the larger particles are spherical and the smaller ones are well faceted. This appears to indicate a nucleation and condensation at different points in the gas stream. That is, the larger particles may be nucleated early at a high temperature and formed liquid droplets before solidification occured. The smaller particles, on the other hand, may have nucleated later at a much lower temperature, forming the solid directly.

Preliminary studies of the sintering characteristics of the ultrafine and pure compounds prepared in accordance with the present invention indicate that they are more reactive and more homogeneous than conventionally solid-state reaction compounds. Furthermore, anionic impurities, such as sulfate or nitrate which are invariably present in compounds made from salts, have been eliminated with the resulting compound being more suitable for sintering and hot forming. For example, $Al_2O_3$ formed by the method of the present invention was found to be particularly suitable for sintering to form a transparent ceramic. The iron oxide formed by this method was found suitable for magnetic applications.

Although the present invention has been described with respect to specific details of certain embodiments thereof, it is not intended that such details be limitations on the scope of the invention except insofar as set forth in the following claims.

I claim:

1. A method for producing a particulate metal oxide comprising the steps of
providing an induction-coupled plasma torch,
introducing a plasma gas into said torch, said plasma gas containing up to 100 percent of oxygen on a free-element basis, the balance of said plasma gas being substantially inert with respect to said metal,
initiating a plasma stream,
introducing in particulate form into said plasma stream at least one metal selected from the group consisting of chromium, lead, magnesium, niobium, silicon, titanium, zirconium, aluminum, and iron, said plasma stream having an enthalpy sufficient to vaporize said metal,
enveloping said plasma stream with a gas containing up to 100 percent of oxygen on a free-element basis, the balance of the enveloping gas being substantially inert with respect to said metal and the plasma gas,
vaporizing the metal particles,
reacting the metal vapors with said oxygen, the amount of oxygen present being at least sufficient for stoichiometric reaction with said metal,
quenching the resulting metal oxide in a stream of gas containing up to 100 percent of oxygen on a free-element basis, the balance of said quenching stream of gas being substantially inert with respect to said resulting metal oxide and said plasma gas, said resulting metal oxide being in finely divided form and being substantially free of any anionic impurity,
separating particles of said finely divided metal oxide up to about 0.5 μm. in size from said quenching stream, and
collecting said separated particles of said metal oxide.

2. The method of claim 1 further comprising the step of separating from said quenching stream particles having a size of more than about 10 μm. prior to said step of separating said particles of finely divided compound.

3. The method of claim 1 wherein said step of separating comprises passing said quenching stream through an electrostatic precipitator.

4. The method of claim 1 wherein said metal introduced into said plasma stream is in particulate form having a size of not over 200 mesh.

5. The method of claim 1 wherein said metal introduced into said plasma stream is in atomized molten form.

References Cited

UNITED STATES PATENTS

| | | | |
|---|---|---|---|
| 3,420,632 | 1/1969 | Ryan. | |
| 3,625,846 | 12/1971 | Murdoch et al. | 204—164 |
| 3,409,403 | 11/1968 | Bjornson et al. | |
| 3,574,546 | 4/1971 | Skrivan | 23—140 X |
| 3,475,123 | 10/1969 | Wilson et al. | 23—202 V |
| 3,642,442 | 2/1972 | Hoekje et al. | 23—140 X |
| 2,921,892 | 1/1960 | Casey | 204—164 |
| 3,361,525 | 1/1968 | De Rycke et al. | 23—140 |

OTHER REFERENCES

Vurzel et al.: "Industrial and Engineering Chemistry," vol. 62, June 1970, pp. 8–14, 22.

HERBERT T. CARTER, Primary Examiner

U.S. Cl. X.R.

204—164; 252—62.64, 62.56; 423—606, 620, 636, 592, 608, 610, 625, 633, 600, 594, 593, 645, 492, 493, 495, 409, 411, 412